(12) United States Patent
Chang et al.

(10) Patent No.: US 10,726,597 B1
(45) Date of Patent: Jul. 28, 2020

(54) OPTICALLY CHALLENGING SURFACE DETECTION FOR AUGMENTED REALITY

(71) Applicant: A9.com, Inc., Palo Alto, CA (US)

(72) Inventors: Jesse Chang, Granada Hills, CA (US); Jared Corso, San Mateo, CA (US); Xing Zhang, Sunnyvale, CA (US); Arnab Sanat Kumar Dhua, Mountain View, CA (US); Yu Lou, Mountain View, CA (US); Jason Freund, Cupertino, CA (US)

(73) Assignee: A9.com, Inc., Palo Alto, CA (US)

( * ) Notice: Subject to any disclaimer, the term of this patent is extended or adjusted under 35 U.S.C. 154(b) by 28 days.

(21) Appl. No.: 16/016,331

(22) Filed: Jun. 22, 2018

Related U.S. Application Data

(60) Provisional application No. 62/633,831, filed on Feb. 22, 2018.

(51) Int. Cl.
*G06T 11/60* (2006.01)
*G06T 7/13* (2017.01)

(52) U.S. Cl.
CPC ............... *G06T 11/60* (2013.01); *G06T 7/13* (2017.01); *G06T 2200/24* (2013.01)

(58) Field of Classification Search
CPC ........ G06T 11/60; G06T 7/13; G06T 2200/24
See application file for complete search history.

(56) References Cited

U.S. PATENT DOCUMENTS

| | | | |
|---|---|---|---|
| 2013/0293582 A1* | 11/2013 | Ng-Thow-Hing | .... G06T 19/006 345/633 |
| 2018/0268220 A1* | 9/2018 | Lee | ...................... G06K 9/4604 |
| 2018/0300668 A1* | 10/2018 | Farley | .................. G06Q 10/083 |
| 2019/0034740 A1* | 1/2019 | Kwant | ............... G06K 9/00798 |
| 2019/0051054 A1* | 2/2019 | Jovanovic | ................. G06T 7/70 |

\* cited by examiner

*Primary Examiner* — Chong Wu
(74) *Attorney, Agent, or Firm* — Hogan Lovells US LLP

(57) ABSTRACT

Approaches in accordance with various embodiments provide for the presentation of augmented reality (AR) content with respect to optically challenging surfaces. Such surfaces can be difficult to locate using conventional optical-based approaches that rely on visible features. Embodiments can utilize the fact that horizontal surfaces can be located relatively easily, and can determine intersections or boundaries of those horizontal surfaces that likely indicate the presence of another surface, such as a vertical wall. This boundary can be determined automatically, through user input, or using a combination of such approaches. Once such an intersection is located, a virtual plane can be determined whose relative location to a device displaying AR content can be tracked and used as a reference for displaying AR content.

20 Claims, 11 Drawing Sheets

OPTICALLY CHALLENGING SURFACE DETECTION FOR AUGMENTED REALITY

CROSS-REFERENCE TO RELATED APPLICATIONS

This application claims priority to U.S. Provisional Application Ser. No. 62/633,831, filed Apr. 27, 2018, and entitled "Optically Challenging Surface Detection for Augmented Reality," which is hereby incorporated herein in its entirety for all purposes.

BACKGROUND

The widespread adoption of portable computing devices, such as smartphones and tablet computers, has resulted in a corresponding increase in the amount and types of electronic content available to users. This includes the providing of augmented reality (AR) content, where image data can be captured for a location and a computing device can render content such that the content appears, at least as displayed on a screen of the device, that the content exists in that physical location. As the device moves or changes orientation, the view of the content can change accordingly, being rendered as if the content corresponds to actual three-dimensional objects being captured by the camera of the device at the appropriate location and angle. Conventional approaches to rendering AR content produce acceptable results with respect to horizontal surfaces, but are less successful in attempting to locate blank walls or other optically challenging surfaces that lack distinct features detectable by an optical sensor.

BRIEF DESCRIPTION OF THE DRAWINGS

Various embodiments in accordance with the present disclosure will be described with reference to the drawings, in which.

DETAILED DESCRIPTION

Figure 1A:
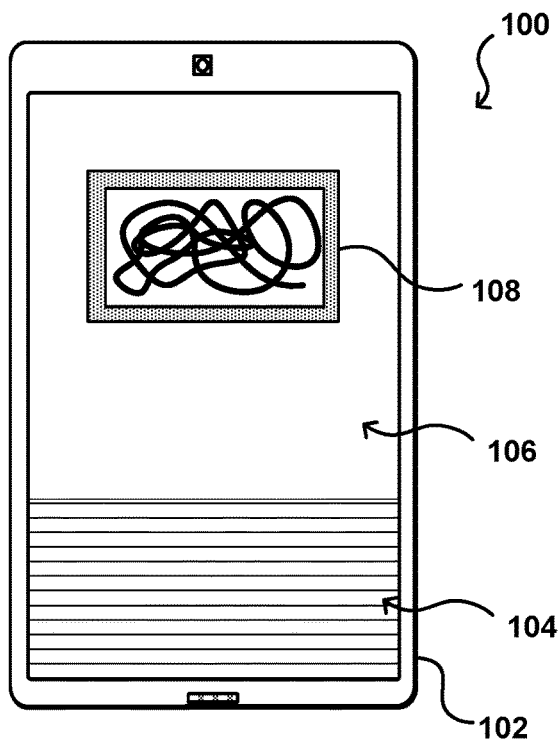
FIGS. 1A, 1B, and 1C illustrate an example attempt to render AR content with respect to a wall that can be utilized in accordance with various embodiments.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Approaches in accordance with various embodiments provide for the presentation of dynamically rendered content, such as augmented reality (AR) content. In particular, various approaches provide for the location of optically challenging surfaces that can be used to position rendered AR content. There can be various optically challenging surfaces, such as bare walls, glass panels, or reflective or textureless surfaces, that can be difficult to locate using conventional optical-based approaches, as these surfaces may lack the features useful in accurately identifying such a surface, as well as its location. Approaches presented herein can take advantage of the fact that horizontal surfaces can be located with relatively high accuracy, due to factors such as objects being present on those surfaces. Edges of those surfaces can be used to identify intersections with other another surfaces, such as may correspond to a vertical wall. Such a boundary can be determined automatically, through user input, or using a combination of such approaches. Once a boundary or intersection is located, a virtual plane can be generated that is "locked" to that position and corresponds generally to the angle or orientation of the vertical wall or other such surface. The relative location and orientation of the virtual plane to a device displaying AR content can be tracked, such that the AR content can be rendered with respect to the plane to appear to be positioned relative to the challenging surface. This can be used to render content such as a virtual painting that appears to be hanging on the vertical wall, even though the wall may otherwise lack features that enable its position to be accurately determined. In addition to displaying AR content, the determination of the location of such surfaces can be utilized for other purposes as well, such as robotic navigation or other implementations where it can be desirable to locate and/or track optically challenging surfaces.

Various other functions can be implemented within the various embodiments as well as discussed and suggested elsewhere herein.

There can be various situations where it may be desirable to render or provide augmented reality (AR) content to one or more viewers through one or more electronic devices. As known for AR content, the view and content displayed on each device can be a function of the location of the device in at least some embodiments, as well as the orientation (or changes in orientation) of the respective device. This enables each device to function as an augmented window on the world, where the augmented content will appear to exist in the real world when viewed through the display of the device, typically laid over a live camera view. The scale, angle, and location of the augmented content can move as appropriate with the change in location and/or orientation of the computing device.

FIG. 1A illustrates an example image 100 of captured image data for a scene, with rendered AR content, that can be utilized in accordance with various embodiments. In this example, image data is captured that represents various objects visible in the scene. As used herein, a "scene" refers generally to a collection of objects, such as foreground and background objects, visible in a physical location. These objects can be positioned in any location relative to a computing device 102 executing the augmented reality application, such as may require a portable device to rotate or otherwise change orientation in order for the objects to fall within a field of view of the relevant camera of the portable device. A camera can capture images of portions of the scene that will include representations of any foreground or background objects contained within a field of view of the camera. Objects contained in the field of view can change as the orientation, zoom, or other aspects of the camera change, such that the portion of the scene represented in the captured image data will change as well. In the image 100 displayed in FIG. 1A, the scene includes a portion of a floor 104 and a portion of a wall 106 in a room. A user executing the application might want to view AR content with respect to a location in the scene, such as to determine how a particular painting 108 might look if hanging on the wall 106. In order to provide such an experience, the AR application would determine the location of the wall, using an appropriate optical technique such as visual odometry, for example. Once the location of the wall is determined, the application can determine and render the AR content such that the AR content appears to be hanging on the wall, as the AR content will cause the picture to appear to have an appropriate scale, position, and orientation for the location of the wall. Approaches for appropriate rendering the AR content include those discussed herein. As the user changes the orientation of the device, the AR content will appear to remain in place with respect to the wall. As discussed herein, the AR application might also be running on a separate computing device receiving input from an AR display device such as goggles or a headset, among other such options.

Figure 1B:
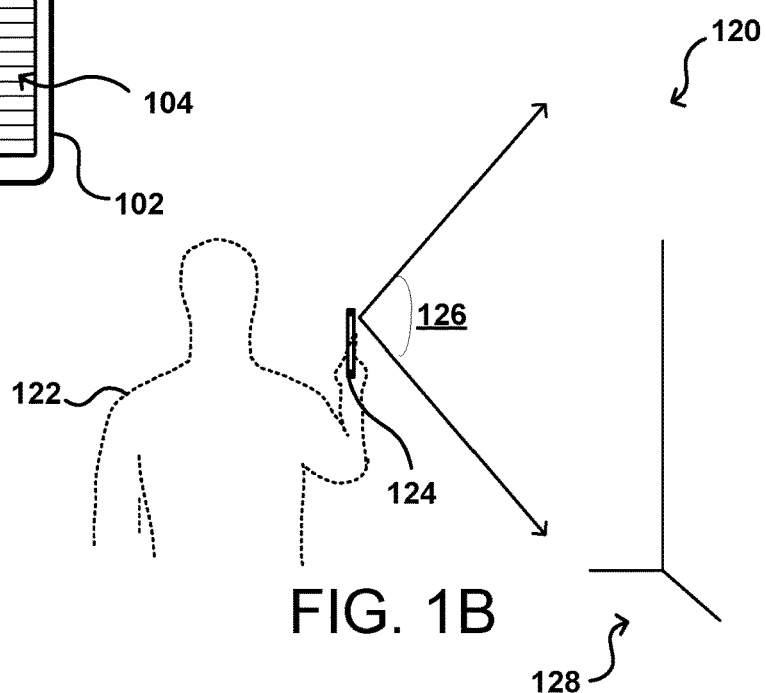
Figure 1C:
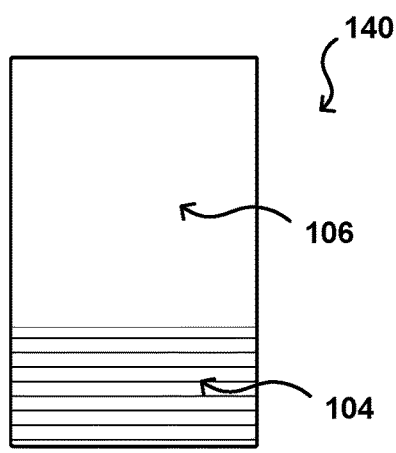

As illustrated in the example situation 120 of FIG. 1B, a user 122 can position a computing device 124 (or other device capable of image or video capture) such that a field of view 126 of at least one camera (or other imaging sensor or apparatus) of the device will include a portion of the wall 128 or scene in which the user wants the AR content to be rendered. Although a user holding a portable device is illustrated, it should be understood that other approaches such as a user wearing glasses containing a display and an optical sensor (or other imaging mechanism) can be utilized as well within the scope of the various embodiments. The captured image data 140 can then be displayed (as an image or frame of live video, for example) to the user through the device, or at least utilized by the device for rendering AR content. As illustrated in the example image data 140 of FIG. 1C, the floor portion 104 may include carpeting, wood planking, or other features that enable the location of the floor to be determined with relative accuracy. The wall portion corresponding to the target location of the AR content, however, has few (if any) visible features, at least enough features to enable the presence and position of the wall to be determined with a necessary level of confidence. This can make it difficult to determine and track the location and shape of the wall, which can in turn result in the projected placement of the AR content being incorrect. Incorrect rendering of the AR content can result in a poor user experience, or at least degrade the perceived realism of the AR content with respect to the physical scene as viewed through the AR display.

Accordingly, approaches in accordance with various embodiments can detect, track, and project objects onto vertical planes (i.e., walls) and other such surfaces in augmented reality. The surfaces can include various optically challenging surfaces, such as highly reflective, transparent, or featureless surfaces, as well as other surfaces that may be difficult to detect or locate. Conventional approaches do not provide a reliable way to detect and track walls using passive techniques such as visual odometry. Visual odometry relies on detecting visual features in order to resolve distance to a plane such as a wall or a floor; however, walls, unlike floors, are often plain and featureless. Approaches in accordance with various embodiments address these and other challenging situations by using detectable surfaces, such as the floor at the base of the wall or the ceiling at the top of the wall, identified using one or more visual features or other such mechanisms. The identification can be automatic by the respective device or application, or can be supplied by a user, and combinations thereof.

In some embodiments, users will be directed to first identify or confirm a location of horizontal plane that intersects a vertical plane of interest. After detecting the horizontal plane, or without such determination in some embodiments, users can be directed to indicate a position or boundary line along which the vertical plane intersects the horizontal plane (i.e., the base of the wall). This can include touching the location on a touch screen, selecting a boundary marker, placing a virtual line, or drawing a virtual line, among other such options. The location can be used as a location at which to position, and lock, a virtual vertical plane representative of the wall surface at that location. An AR application can then cause a three-dimensional (3D) model to be rendered for display proximate a determined location on the virtual plane, and movement of the 3D object can be virtually locked into position on, or proximate, the vertical plane (i.e., wall). To ensure that tracking of the vertical plane is not lost or does not become inaccurate, users in some embodiments can be directed to keep at least a portion of the horizontal boundary line in view of the camera if possible. In other embodiments one or more computer vision processes, or other object recognition approaches, can be used to automatically determine the location(s) of such a boundary, or at least suggest the appropriate boundary for confirmation by the user. These approaches can include, for example, semantic segmentation with (or without) deep learning, where semantic labels can be applied to various pixels or other portions of a set of image data, etc.

In one embodiment, an AR application can provide for robust real-time detection, tracking, and projection of virtual objects on uniform vertical surfaces lacking visual features within a camera view. A user can access a mobile app on a mobile device. The mobile app can utilize an augmented reality framework capable of detecting a horizontal surface, such as ARKit or ARCore, among other such options. The mobile device (or other appropriate computing device) can be equipped with at least one camera, a processor, an accelerometer, and a gyroscope, although these may be distributed across component of an AR system in other embodiments. The user can select an object and a vertical surface where the user desires to place the virtual object (e.g., fine art, posters, wall clocks, televisions). The app can then activate (or otherwise cause to receive data from) one or more sensors of the device, such as image data from a camera or other optical sensor, IR data, structured light data, etc. The user can then aim or orient the device (in particular, the camera or optical sensor) towards the vertical surface, bringing into the field of view a horizontal surface with prominent visual features intersecting the desired vertical surface (i.e., a tiled floor). The app can detect and track relative distance and positioning between the device and the horizontal surface using the visual features of the horizontal surface and techniques such as visual odometry. The mobile app can then utilize this horizontal surface as an anchor point that the app will track. The final three-dimensional placement of the virtual object will be with respect to this anchor point in at least some embodiments.

After the horizontal surface has been successfully detected, the user in some embodiments will demarcate the border between the horizontal surface and the desired and intersecting vertical surface, although in some embodiments the determination will be done automatically as discussed elsewhere herein. This establishes and fixes a two-dimensional vertical plane, relative to the anchor point, along which (or proximate to) one or more virtual objects or other AR content can be positioned. In one embodiment a user can demarcate the border by marking one or two points along the border. In another embodiment the user can demarcate the border by drawing or placing a line along the border. In another embodiment the app will automatically demarcate the border using either a search-based or zero-crossing based edge detection technique. In another embodiment a user can demarcate the border by aligning a 3D visual of a vertical surface, or other virtual marker, with the desired vertical surface. In various embodiments, the marking of the border or intersection can include selecting or confirming a detected line, as discussed, or drawing a new line, which can cause the process to search for the nearest detected boundary and "snap" to that boundary, such that the line drawn or provided by the user does not have to be particularly precise in position or shape, among other such options. In some embodiments the closest real edge detected from the image will be selected. After the vertical surface has been established and fixed relative to the horizontal surface anchor point, the user will then select and/or place one or more virtual objects into the user's desired position by dragging and dropping the virtual object along, or proximate to, the vertical plane. This can then enable the virtual object to be displayed as an overlay over a live camera view, with appropriate scale, position, and orientation, so as to appear to correspond to an actual object positioned in the scene proximate the vertical surface (i.e., hanging on the physical wall).

As mentioned, an AR application can obtain orientation and/or position information from the computing device, such as may be provided by a sensor or component such as an electronic compass, inertial sensor, accelerometer, and the like, In some embodiments translation movements (as determined using GPS or iBeacon, etc.) can be accounted for as well.

In some embodiments, scene data can correspond to any appropriate location or region, as may correspond to a closed or otherwise defined space. There may be one or more users viewing augmented reality content in the scene using a respective augmented reality (or AR-capable) device. These devices can be any appropriate devices capable of displaying augmented reality content, such as may include smart phones, tablet computers, smart glasses or contacts, AR goggles, and the like. In some embodiments the AR content will be rendered over a live camera view captured by the device and displayed on a display screen, such as on a smart phone, but in other embodiments the content may be displayed over an actual view, such as for smart glasses. In various embodiments the devices will have at least some type of position and/or orientation determination mechanism, such as a global positioning system (GPS) sensor or electronic gyroscope, which can enable the view to be determined in such a way as to render the AR content with an appropriate angle, scale, and rotation, etc.

In order to make the AR content appear to be as realistic as possible, it can be desirable in many situations to further cause the rendered objects to appear to be positioned on, or with respect to, actual surfaces in the scene. This can include, for example, being positioned on a track, field surface, tabletop, or other object or element (physical or virtual) in the scene. Further, it can be desirable that these objects are all of the appropriate scale and location with respect to each other, and that these relationships remain consistent unless intentionally varied within the content presentation. In order to provide such functionality, it can be desirable to map, model, or otherwise generate an accurate representation of the scene, so that the content can be rendered appropriately with respect to that representation. While in some instances the scene may be a fixed and well-known set of objects that does not change, in other instances the scene may not be well known or may be able to vary. In other embodiments the position and/or orientation of a respective device may be unable to be determined with sufficient accuracy to prevent any noise or error from being injected into the AR content as rendered.

It therefore can be desirable in at least some embodiments to determine the distance to various objects, locations, surfaces, and/or points in the gameplay field, or other appropriate area, for each individual device, such that the AR content is rendered and displayed appropriately for that specific device based on the current location and orientation. This can include, for example, capturing image data using a rear facing camera and analyzing that image data using a computer vision algorithm to identify the locations of specific types of surfaces, shapes, points, objects, or other such elements in the scene. Various algorithms can attempt to recognize various features and/or anchor points which can be used to identify surfaces, for example, which can be used as a reference for rendering AR content. Various other approaches can be used as well, as may include structured lighting, stereoscopic imaging, ultrasonic image, LIDAR scanning, and the like. Many portable computing devices or other consumer electronics may not have these and other such sensors or mechanisms, and thus may need to rely upon cameras or more basic data capture mechanisms.

Figure 2A:
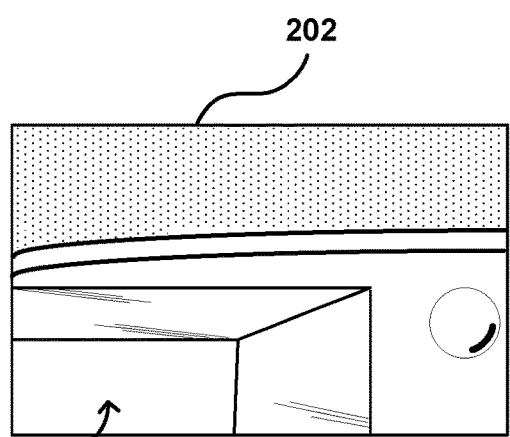
FIGS. 2A, 2B, 2C, and 2D illustrate an example approach to rendering augmented reality content that can be utilized in accordance with various embodiments.
Figure 2B:
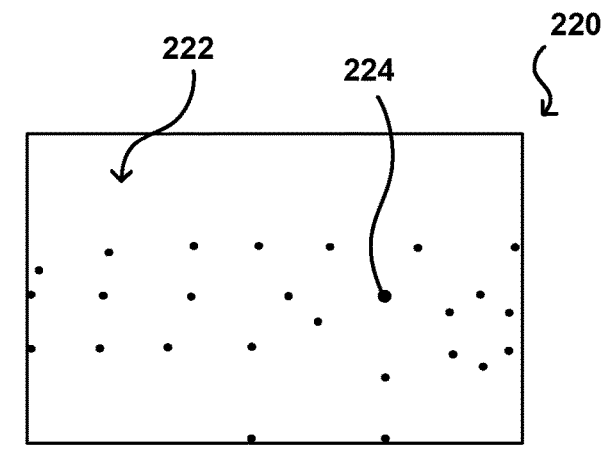

In various embodiments, the scene data to be analyzed from the various devices will correspond to positions of features detected from image or other data captured using a camera or other such sensor or component on each respective device. As illustrated in the example image 200 of FIG. 2A, for a given device image data may be captured that includes representations of various objects within a field of view of the camera or sensor, etc. In at least some embodiments, computer vision algorithms can be used to attempt to recognize objects, or at least differentiate between objects, in the image data and generate or determine representative data points. These points can correspond to unique or representative features, as known for computer vision applications. For a given image, a set of points can be generated as illustrated in the point set 220 of FIG. 2B, where the points can include feature points 222 and various anchor points 224, which can be used to identify specific objects in the scene. As known for various AR applications, anchor points can be used to identify surfaces or other contours or regions respect to which an AR element can be rendered. In various embodiments, each data point in the point set 220 can have coordinate data determined with respect to the device, such as an (x, y, z) or other coordinate set in two or three dimensions, which can be determined with respect to an axis having an origin at the sensor of the device. For example, an x value of 2.1 feet can correspond to 2.1 feet along the x direction from a camera sensor. In order to correlate the data from the various devices, the relative position and orientation of the devices can be determined. Similar points than then be correlated, and an authoritative position for each point or object determined based on the correlated data.

Figure 2C:
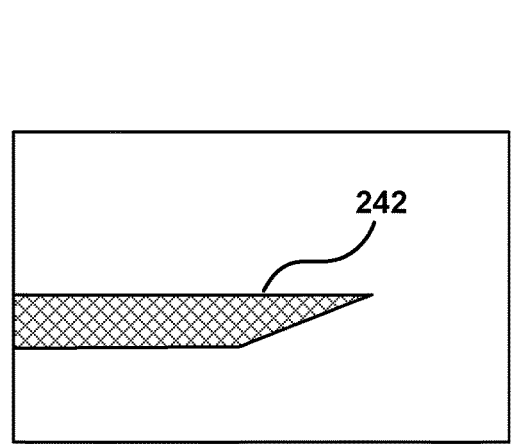
Figure 2D:
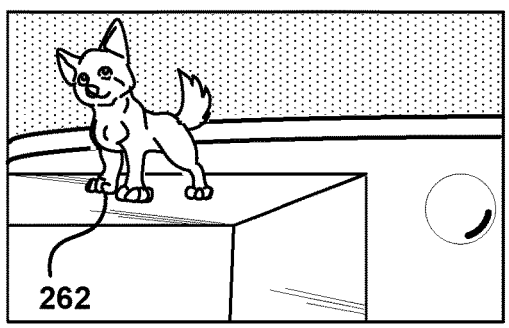

For various AR applications, it can be desirable to locate various surfaces, contours, or objects that can be used as reference points for rendering AR content. For example, various embodiments can attempt to locate surfaces, particularly relatively smooth and horizontal surfaces, that can serve as positioning locations for AR content. As an example, the data points from FIG. 2B (and potentially as aggregated or processed as discussed herein) can be analyzed to determine that there is a horizontal surface represented in the data. This can correspond to the box 204 or other such object represented in the image data. In response to detecting such a surface, and in some embodiments ensuring that various criteria are satisfied as may relate to size, angle, or smoothness, etc., a polygon 242 or other geometric shape or construct can be generated as illustrated in the example 240 of FIG. 2C. Information (e.g., coordinates) for this geometric construct can be determined on the device, or sent to the device, and used for placing rendered AR content. Sending geometric construct data can require much less bandwidth and memory than a full point cloud for a region, although in some embodiments point clouds can be used as well, or in place of the constructs. The constructs can have position and anchor points, for example, which can be used to define the location and shape of the construct. This relatively lightweight construct, definable using a relatively small set of points, allows for rapid adjustment in relative positioning based upon movement of a respective viewing device. This construct can be used as a reference for rendering AR content. As illustrated in the example image 260 of FIG. 2D, a live view of the gameplay field is displayed as captured by the camera. Based at least in part upon the position of the geometric construct, which would typically not actually be displayed on the screen but maintained as data in memory, can be used as a reference to render a character 262 or other AR element as an overlay with respect to the live view. As the device displayed the content changes position or orientation, the respective position of the geometric construct will change as well. This change can trigger a corresponding change in the rendering of the AR element 262, to maintain a consistent scale, position, and angle with respect to the geometric construct. In this example, the AR content can be rendered such that the dog is displayed to be standing on the box whenever the box is contained in (or near) a field of view of the camera of the device. While the dog or other character can move and perform various actions, its position in the gameplay field (or other such area) can be tracked with respect to at least one anchor point or construct, such that the rendering is consistent not only for a single device but across all devices accessing the AR content for that session and at or near that location.

As mentioned, in order to improve the realism of the augmented reality content it can be desirable to determine lighting state data for the scene that should be used to light or shade the AR object during the rendering process. The lighting state data can also provide the ability in at least some embodiments to adjust the appearance of the AR image, including the live view of the scene, by adjusting one or more aspects of the lighting state. In at least some embodiments, lighting state information, other than or in addition to that related to environment maps as discussed herein, can be obtained or determined using data from a number of different sources. One example source is the captured image data itself. The image data in some embodiments can be analyzed to determine information such as an average brightness and contrast value, or range of those values, for the image as a whole or a portion proximate a location for the AR content. The image data can also be analyzed to attempt to determine the direction of various shadows, such as by determining the longest axis or dimension of each shadow or dominant vector direction, to extrapolate the locations of various light sources that may not be represented in the image data. The image data can also be analyzed to attempt to determine light sources that are represented in the image data, and may analyze the locations of these light sources as represented in the captured image data while the camera (or device including the camera) undergoes orientation changes, such as rotations about an axis, and perform various geometric operations to attempt to determine the locations of those light sources. Other approaches to determining distance and position of objects can be used as well as discussed and suggested elsewhere herein.

Other types of information can be utilized as well. For example, a light sensor of the computing device may be used to determine an ambient light level for a scene, among other such values. Multiple light sensors, or sensors capable of determining values for different regions or directions, can also be used. In some embodiments, information about the time, location, date, and/or orientation of the device (or the camera on the device) can be used to calculate lighting information. For example, an outdoor scene during daylight hours may be primarily illuminated by sunlight. By knowing the geographic location and time of day, an estimate can be made as to the brightness of daylight available and the direction in which the sunlight is received, impacting shadows and other such aspects. Other information can be used to improve the accuracy as well, such as date information which can help to better determine the location of the sun relative to the scene. Information about the weather can also be used if available, and in some embodiments aspects of the image data can be used to determine lighting information. For example, if it is noon on a day when the sun should be directly overhead but the image data or data from the brightness sensor indicate that there is an unexpectedly low level of brightness or ambient light, then it can be assumed that it is a cloudy day or raining, etc. In some embodiments the image data can be analyzed to detect the presence of objects such as snow or water which can impact reflections, shadows, and overall brightness. Various other types of information can be analyzed or considered as well within the scope of the various embodiments.

The information about the various lighting sources, including position, intensity, color, and other such information, can be used to generate a light map for the scene. The light map in some embodiments can include a three-dimensional mapping of any or all determined sources of light that can contribute lighting to the scene. This can include light sources of one or more determined types in some embodiments, as may include the sun and light sources such as bulbs, LEDs, etc. In other embodiments this can include anything that can impact lighting and reflections, as may include snow, water, mirrors, bright objects, and the like. In addition to the position in three dimensions of a reference coordinate system, for example, information for each light source can be tracked and updated over time, such as whether the light source is active or appreciably contributing to the lighting of the scene. This can include, for example, the object having a relative brightness or other such aspect(s) that would impact the appearance of one or more objects in the scene, or the shadow(s) created by those objects. This can be based on a brightness or illumination threshold, or other such criterion. Other aspects such as the current color, intensity, or brightness can be tracked as well. For the sun, moon, or other mobile or non-stationary sources, the position information can also be updated over time as appropriate. Such a map can be used along with a cube map or other environment map to improve the appearance of the AR objects.

Figure 3A:
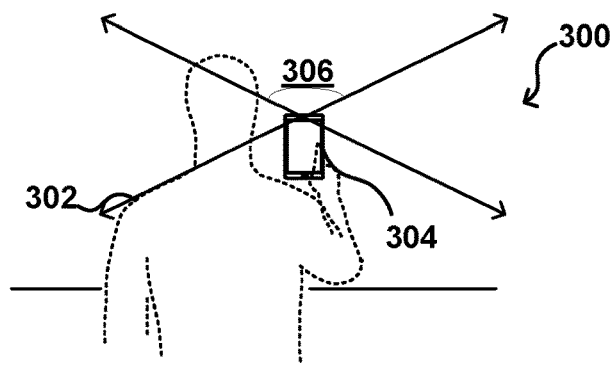
FIGS. 3A, 3B, 3C, and 3D illustrate an example approach to locating a boundary of a vertical surface that can be utilized in accordance with various embodiments.
Figure 3B:
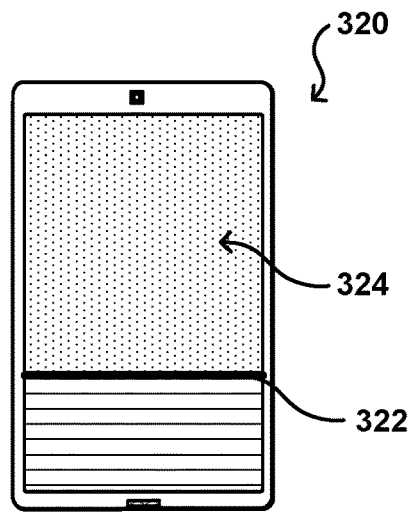

In various embodiments discussed herein, a user will need to orient a computing device, or electronic device in communication with a computing device or system, to capture image data (or other sensor data) representative of the surface to be used for placing AR content. In the example situation 300 of FIG. 3A, a user 302 is positioning a portable computing device 304 such that a portion of a wall of interest is within the field of view 306 of a camera of the device. As illustrated in the example situation 320 of FIG. 3B, an AR application executing on the device can analyze the captured image data to attempt to identify a horizontal surface such as the floor, and a boundary 322 of that horizontal surface with a vertical surface, to identify the location of the vertical surface, here the wall. The app can use the border 322, or at least points along the border, as an anchor for a virtual plane 324 determined to correspond to the wall. This plane can be used for positioning virtual objects or other AR content as discussed herein.

Figure 3C:
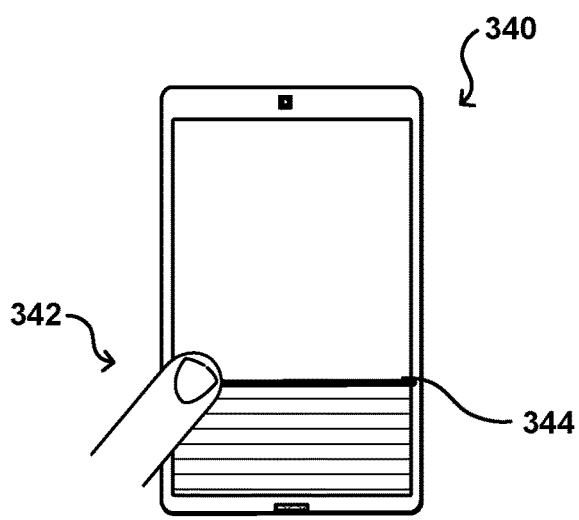
Figure 3D:
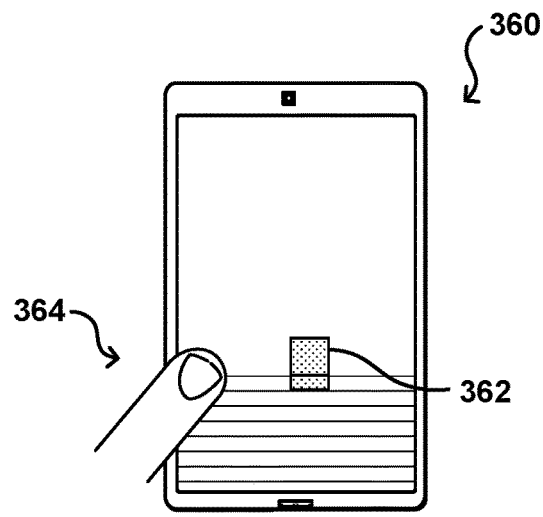

As mentioned, in some embodiments the app may not automatically detect such borders, or may revert to the user if such a border cannot be determined with sufficient confidence. Accordingly, at least some user input may be required to identify the appropriate boundary. In the example situation 340 of FIG. 3C, a user can use a finger 342 or other object to select or specify the appropriate location, such as by touching the appropriate location on a touch screen displaying a live view of the scene. Similarly, in the example situation 360 of FIG. 3D, a user might tap the screen using a finger 364 or other object (or provide other input) when a marker 362 displayed on the screen corresponds to a position of the border or intersection. This placement can be determined automatically, manually, or through movement of the device in various embodiments.

Figure 4A:
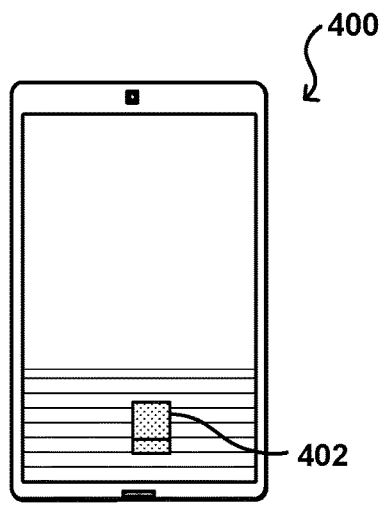
FIGS. 4A, 4B, 4C, and 4D illustrate another example approach to locating a boundary of a vertical surface that can be utilized in accordance with various embodiments.
Figure 4B:
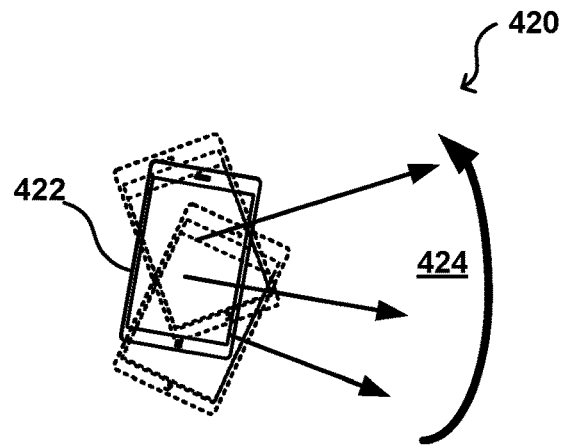
Figure 4C:
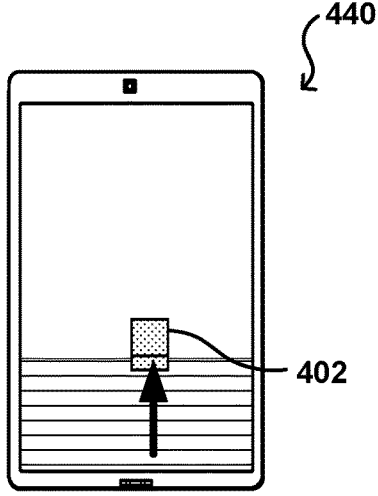
Figure 4D:
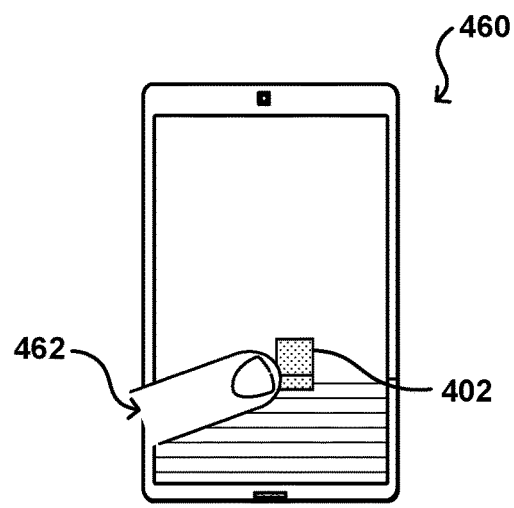

In some embodiments the user can adjust the orientation of the device to place a marker at the appropriate location in the image data. For example, in the situation 400 of FIG. 4A a marker 402 is rendered as an overlay with respect to a live view of the scene. The user can adjust 424 the orientation of the computing device 422 as illustrated in the situation 420 of FIG. 4B to adjust the portion of the scene contained in the field of view. As illustrated in the example 440 situation of FIG. 4C, such change in orientation can cause a corresponding motion of the marker 402 relative to the scene. When the marker is aligned with the border or intersection of the floor with the wall (or ceiling with the wall, etc.), the user can use a finger 462 or other mechanism to provide input to the computing device that the location of the marker 402 corresponds to the border. This can then be used as an anchor point for rendering virtual objects as discussed herein.

Figure 5:
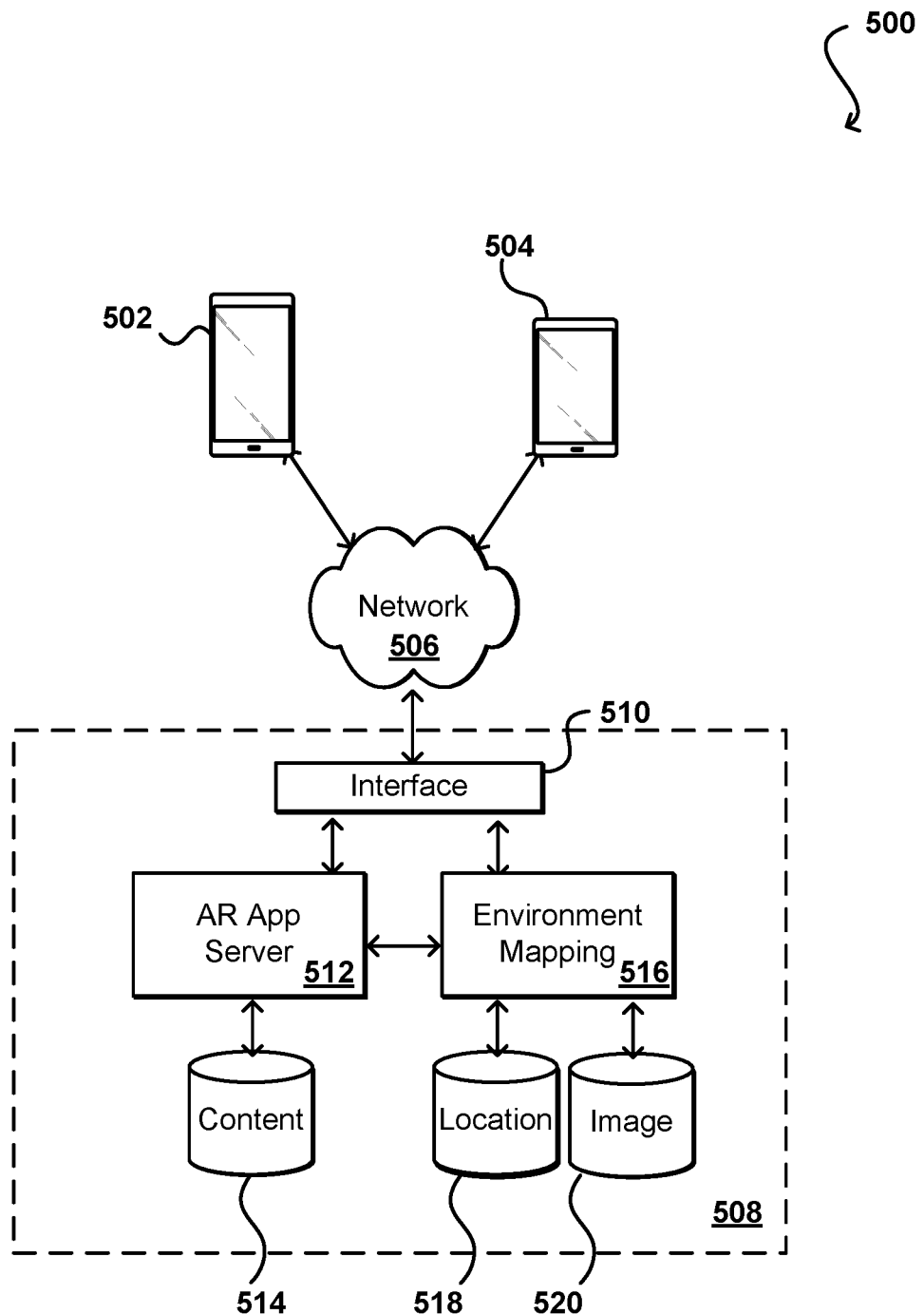
FIG. 5 illustrates an example system that can be used to generate, store, and share cube map data that can be utilized in accordance with various embodiments.

As mentioned, in various embodiments the environmental mapping can be performed on the individual devices for use in one or more AR applications executing on the device. In some embodiments at least some of the image, scene, or map data can be sent from one or more devices 502, 504 to a remote service environment 508, or other such system or service, as illustrated in the example system 500 of FIG. 5. While an augmented reality application server is discussed in this example, it should be understood that any service or set of resources dedicated or allocated to generating or managing environmental maps for use in augmented reality and/or other applications can be utilized as well within the scope of the various embodiments. In this example, an AR application, such as an augmented reality-inclusive game, is hosted on at least one application server 512. The application server 512 can be a local machine or a remote server operated by an application or content provider, among other such options. In this example the AR application supports the management of environment maps, such as cube maps, that can be utilized by players or users of the AR application. This can include generating and storing an environment map using data from a first player device 502, or generating a map using data from multiple devices 504, for use with the respective devices or any other device in a scene location corresponding to the environment map. The respective devices 502, 504 can connect to the application server 512 over at least one network 506, such as the Internet, a local area network, a dedicated gaming network, a peer-to-peer network, or a cellular network, among other such options and combinations thereof. The request can be received to an interface, such as an application programming interface (API) of an interface layer 510, which can cause the request to be directed to the application server 512. The application server 512 can then retrieve any appropriate content from a content repository 514 and transmit the application content to the respective device(s). Alternatively, if the request or call from a device includes image or scene data, information for the request can be directed to an environment mapping service 516, system, or component, which can use the information to generate an environment map for that device. In still other embodiments the environment maps can be generated on the devices themselves, among other such options. As mentioned, generating such a map can include processing the received image data and stitching the processed images together to form an environment map, such as a cube map, that can then be sent back to the device for use in the AR application.

The environment mapping service 516 can receive image data from one of more devices, along with orientation data for each image, that can be stored to an image repository 520. This can enable the image or environment data to be accessed as needed on demand, such as in response to movement of the device or selection of new AR content. In at least some embodiments the generated environment data will be stored to a location repository 518, which can include information about the anchor point(s) or virtual planes, among other such options.

When a user device is to render AR content in a scene location, the device in some embodiments can first check with the application server 512 to determine whether an environment map exists and is stored in the map repository 518 that can be provided to the device for use in lighting the AR content, at least as a default map that the device can update or build from. In some embodiments other data might be used that can determine the map to provide as well. For example, the data might include time and/or date data, which can be used to select different versions of an environment map, or different environment maps, for the same scene location. For example, one map might be generated for a location during daylight hours, and another generated during night time hours. Storing the date and/or time information can enable the appropriate environment map to be provided for a received request. While a single map might be used with the brightness or colors adjusted, there may be different light sources (e.g., the sun) present during the day that are not present at night, and other light sources (e.g., lamps) that are active at night but typically not during the day, etc. Various other data can be used to select from multiple maps for a scene location in accordance with the various embodiments.

In some embodiments one or more servers can execute an AR application, while in others the servers can manage state for instances of the app executing on the various devices. These devices can include computing devices such as smart phones, tablet computers, wearable computers (e.g., smart glasses or watches), desktop or notebook computers, and the like. State information can be transmitted to the server at appropriate times, such as periodically, in response to certain actions or occurrences in the app, in response to requests from the server, or at other appropriate times. The server can maintain the state information such that the state is consistent across the various devices, as well as to enable a saving or restoring of the state for any or all of the devices. This can include, for example, maintaining an authoritative point cloud, set of position information, or set of geometric constructs for a scene, such as a room, as discussed herein. The server can build up this information using data received from the various devices, and update the information based on updates to the received data. The server can maintain this point or construct data as part of the stored state, and can send the information across the appropriate network(s) to the various devices as appropriate, such as may be based upon the location and orientation of the device, and the corresponding field of view for which AR content can be rendered. In other embodiments, however, the position or construct data can be sent between devices independent of the game server, either through the network or directly using a local communication protocol (e.g., Bluetooth or NFC). In situations where the data is sent between devices, the devices can either agree upon an authoritative data set or make local determinations for local rendering on the respective devices, among other such options.

As mentioned, the location for each device can be determined using an appropriate technology or mechanism, such as GPS, iBeacon, or signal triangulation, among other such options. Movement of the device or changes in orientation can be determined using any of a number of sensors or components of the devices themselves, such as may include an electronic compass, magnetometer, accelerometer, electronic gyroscope, altimeter, and the like. The object and position information can be determined from captured sensor data, where the sensors can include various camera sensors (IR, ambient, stereoscopic), structure light components, ultrasonic sensors, or LIDAR sensors, among others.

Figure 6:
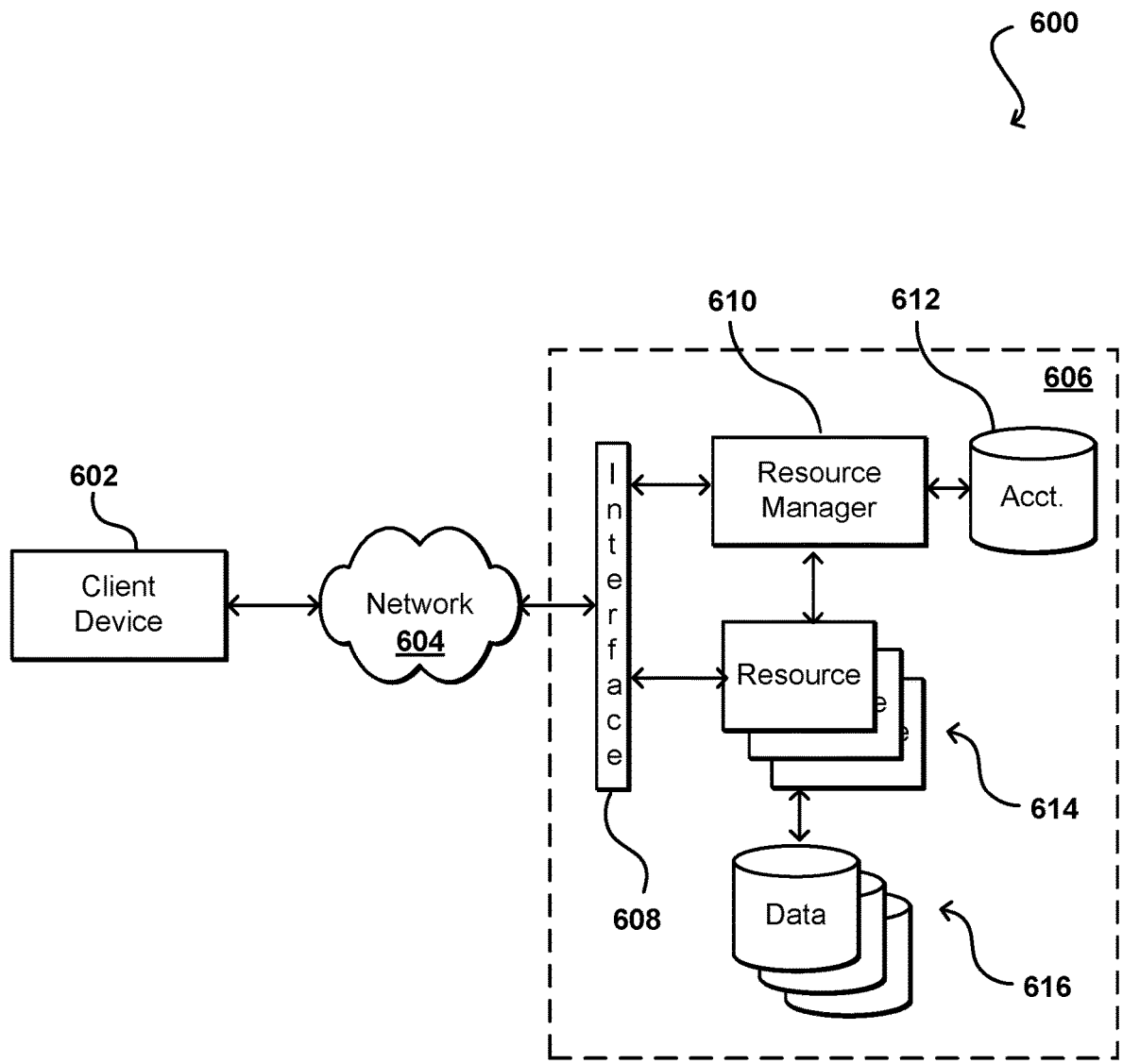
FIG. 6 illustrates an example environment in which various embodiments can be implemented.

FIG. 6 illustrates an example environment 600 in which aspects of the various embodiments can be implemented. In this example a user is able to utilize a client device 602 to submit requests across at least one network 604 to a multi-tenant resource provider environment 606. The client device can include any appropriate electronic device operable to send and receive requests, messages, or other such information over an appropriate network and convey information back to a user of the device. Examples of such client devices include personal computers, tablet computers, smart phones, notebook computers, and the like. The at least one network 604 can include any appropriate network, including an intranet, the Internet, a cellular network, a local area network (LAN), or any other such network or combination, and communication over the network can be enabled via wired and/or wireless connections. The resource provider environment 606 can include any appropriate components for receiving requests and returning information or performing actions in response to those requests. As an example, the provider environment might include Web servers and/or application servers for receiving and processing requests, then returning data, Web pages, video, audio, or other such content or information in response to the request.

In various embodiments, the provider environment may include various types of resources that can be utilized by multiple users for a variety of different purposes. As used herein, computing and other electronic resources utilized in a network environment can be referred to as "network resources." These can include, for example, servers, databases, load balancers, routers, and the like, which can perform tasks such as to receive, transmit, and/or process data and/or executable instructions. In at least some embodiments, all or a portion of a given resource or set of resources might be allocated to a particular user or allocated for a particular task, for at least a determined period of time. The sharing of these multi-tenant resources from a provider environment is often referred to as resource sharing, Web services, or "cloud computing," among other such terms and depending upon the specific environment and/or implementation. In this example the provider environment includes a plurality of resources 614 of one or more types. These types can include, for example, application servers operable to process instructions provided by a user or database servers operable to process data stored in one or more data stores 616 in response to a user request. As known for such purposes, the user can also reserve at least a portion of the data storage in a given data store. Methods for enabling a user to reserve various resources and resource instances are well known in the art, such that detailed description of the entire process, and explanation of all possible components, will not be discussed in detail herein.

In at least some embodiments, a user wanting to utilize a portion of the resources 614 can submit a request that is received to an interface layer 608 of the provider environment 606. The interface layer can include application programming interfaces (APIs) or other exposed interfaces enabling a user to submit requests to the provider environment. The interface layer 608 in this example can also include other components as well, such as at least one Web server, routing components, load balancers, and the like. When a request to provision a resource is received to the interface layer 608, information for the request can be directed to a resource manager 610 or other such system, service, or component configured to manage user accounts and information, resource provisioning and usage, and other such aspects. A resource manager 610 receiving the request can perform tasks such as to authenticate an identity of the user submitting the request, as well as to determine whether that user has an existing account with the resource provider, where the account data may be stored in at least one data store 612 in the provider environment. A user can provide any of various types of credentials in order to authenticate an identity of the user to the provider. These credentials can include, for example, a username and password pair, biometric data, a digital signature, or other such information. The provider can validate this information against information stored for the user. If the user has an account with the appropriate permissions, status, etc., the resource manager can determine whether there are adequate resources available to suit the user's request, and if so can provision the resources or otherwise grant access to the corresponding portion of those resources for use by the user for an amount specified by the request. This amount can include, for example, capacity to process a single request or perform a single task, a specified period of time, or a recurring/renewable period, among other such values. If the user does not have a valid account with the provider, the user account does not enable access to the type of resources specified in the request, or another such reason is preventing the user from obtaining access to such resources, a communication can be sent to the user to enable the user to create or modify an account, or change the resources specified in the request, among other such options.

Once the user is authenticated, the account verified, and the resources allocated, the user can utilize the allocated resource(s) for the specified capacity, amount of data transfer, period of time, or other such value. In at least some embodiments, a user might provide a session token or other such credentials with subsequent requests in order to enable those requests to be processed on that user session. The user can receive a resource identifier, specific address, or other such information that can enable the client device 602 to communicate with an allocated resource without having to communicate with the resource manager 610, at least until such time as a relevant aspect of the user account changes, the user is no longer granted access to the resource, or another such aspect changes.

The resource manager 610 (or another such system or service) in this example can also function as a virtual layer of hardware and software components that handles control functions in addition to management actions, as may include provisioning, scaling, replication, etc. The resource manager can utilize dedicated APIs in the interface layer 608, where each API can be provided to receive requests for at least one specific action to be performed with respect to the data environment, such as to provision, scale, clone, or hibernate an instance. Upon receiving a request to one of the APIs, a Web services portion of the interface layer can parse or otherwise analyze the request to determine the steps or actions needed to act on or process the call. For example, a Web service call might be received that includes a request to create a data repository.

An interface layer 608 in at least one embodiment includes a scalable set of customer-facing servers that can provide the various APIs and return the appropriate responses based on the API specifications. The interface layer also can include at least one API service layer that in one embodiment consists of stateless, replicated servers which process the externally-facing customer APIs. The interface layer can be responsible for Web service front end features such as authenticating customers based on credentials, authorizing the customer, throttling customer requests to the API servers, validating user input, and marshalling or unmarshalling requests and responses. The API layer also can be responsible for reading and writing database configuration data to/from the administration data store, in response to the API calls. In many embodiments, the Web services layer and/or API service layer will be the only externally visible component, or the only component that is visible to, and accessible by, customers of the control service. The servers of the Web services layer can be stateless and scaled horizontally as known in the art. API servers, as well as the persistent data store, can be spread across multiple data centers in a region, for example, such that the servers are resilient to single data center failures.

Figure 7:
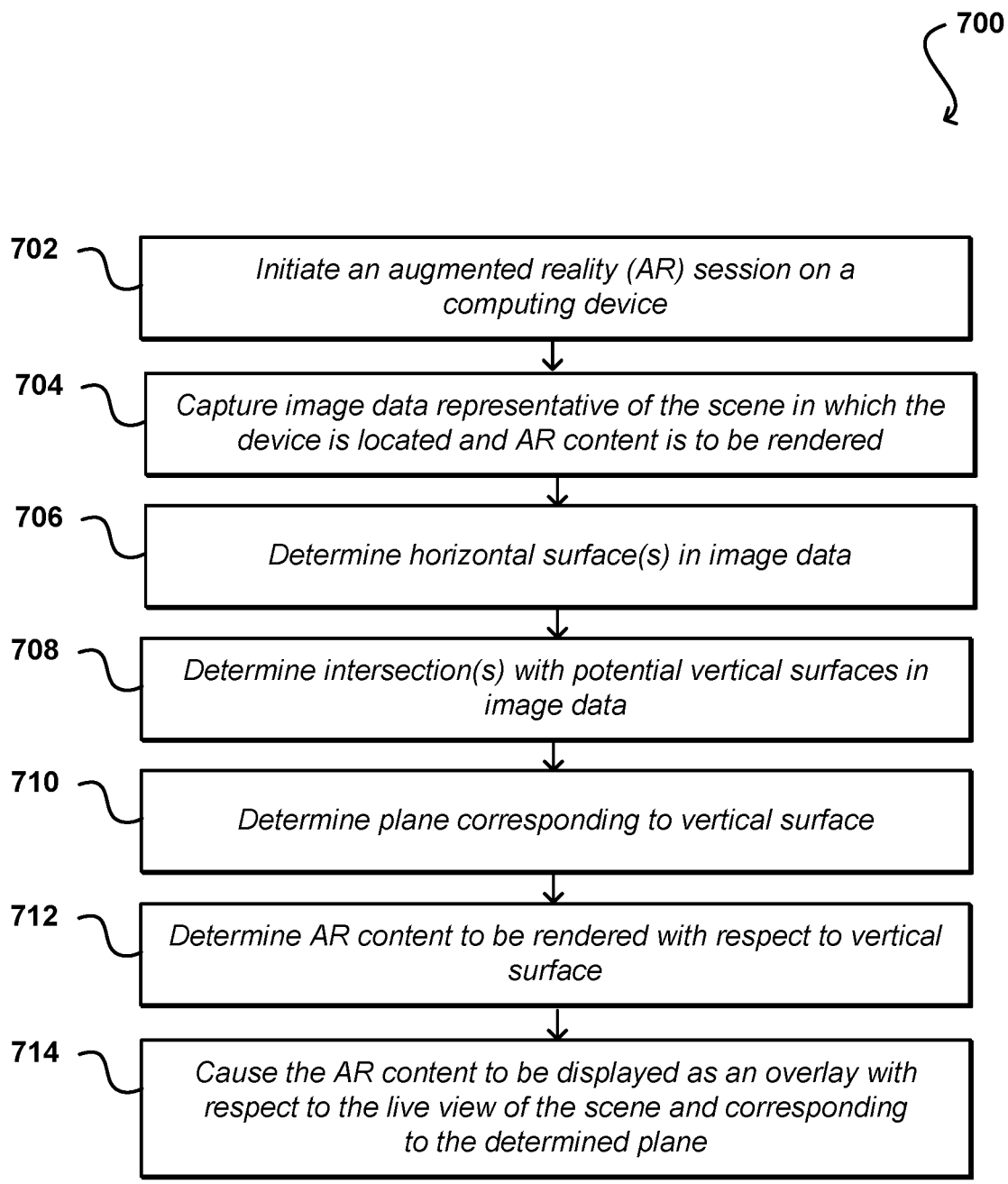
FIG. 7 illustrates a first example process for rendering AR content with respect to an optically challenging surface that can be utilized in accordance with various embodiments.

FIG. 7 illustrates an example process 700 for rendering AR content with respect to an optically challenging surface that can be utilized in accordance with one embodiment. It should be understood for this and other processes discussed herein that there can be additional, alternative, or fewer steps performed in similar or alternative orders, or in parallel, within the scope of the various embodiments unless otherwise stated. In this example, an augmented reality (AR) session is initiated 802 on a computing device. This can include, for example, a user running an AR-inclusive application on the device or joining in a multiplayer online session, among other options discussed and suggested herein. In order to provide for the rendering of AR content, image data can be captured 804 that is representative of the scene in which the device is located and the AR content is to be rendered. For example, this can include representations of objects, surfaces, and other elements visible from a current location of the computing device or contained within a field of view of a camera of, or associated with, the computing device, among other such options. The image data can be associated with orientation and position data for the device, in order to correlate the field of view of the camera with a portion of the surrounding scene. Based at least in part upon the captured image (or other sensor) data, one or more horizontal surfaces can be determined 706 or identified. In some embodiments the surfaces will be analyzed using other available information to attempt to identify floors or ceilings that are of particular interest in determining vertical or other surfaces. The application (or remote server, etc.) can then attempt to determine 708 one or more intersections of a horizontal surface with a vertical surface, or borders of a horizontal surface indicative of the location of such a surface. As mentioned, this can be done automatically, manually, or with user assistance in various embodiments. A plane corresponding to the vertical (or other optically challenging) surface can then be determined 710, along with an appropriate anchor point or other such feature. The AR content or other virtual object to be rendered can also be determined 712, such as by locating a three-dimensional model or representation of an object identified by the user or application. The application can then cause 714 the AR content to be rendered and displayed as an overlay with respect to a live view of the scene, with a scale, placement, and orientation corresponding to the location of the virtual plane for the surface.

Figure 8:
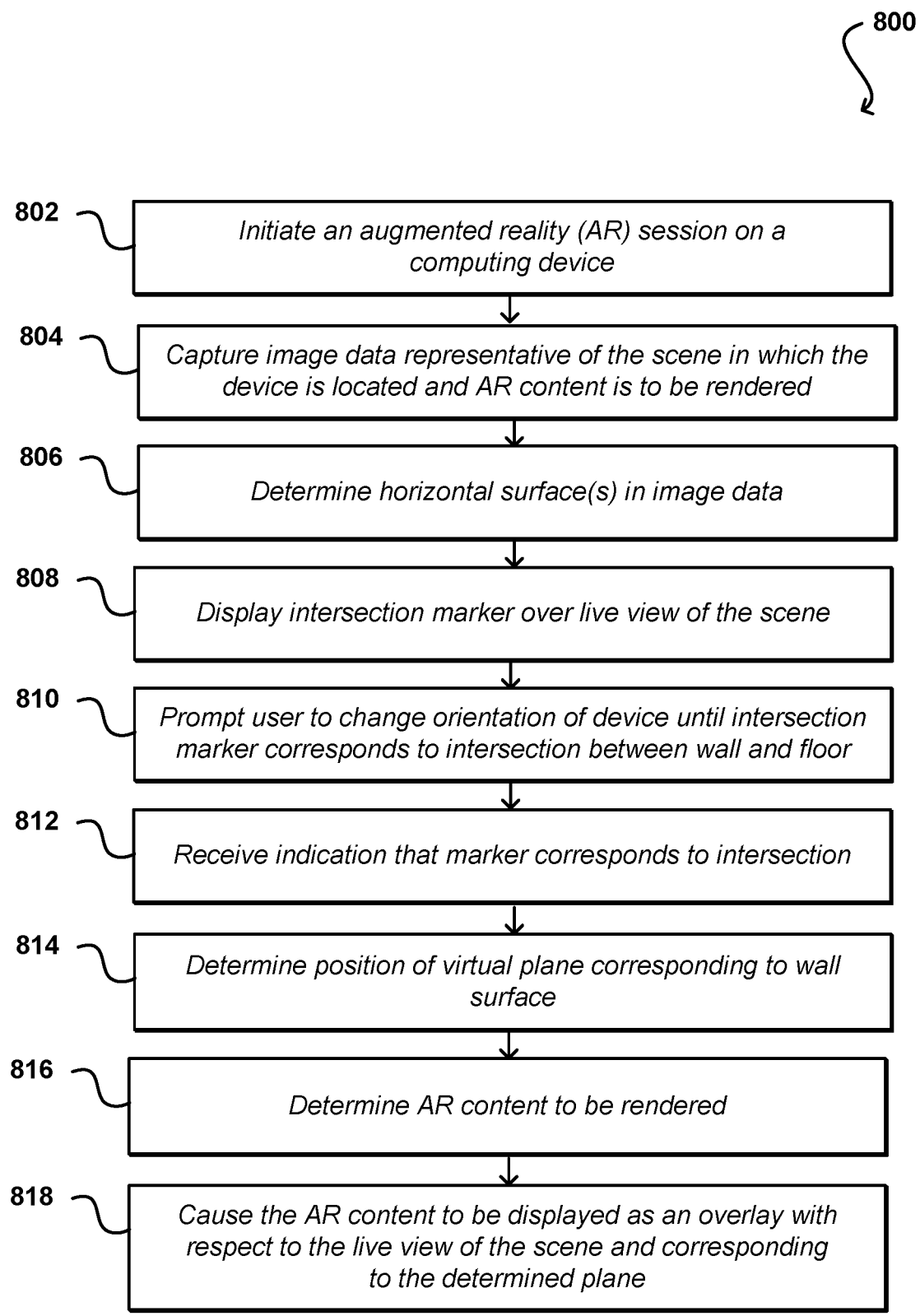
FIG. 8 illustrates a second example process for rendering AR content with respect to an optically challenging surface that can be utilized in accordance with various embodiments.

FIG. 8 illustrates another example process 800 for rendering virtual objects with respect to optically challenging surfaces that can be utilized in accordance with one embodiment. In this example, an AR session is again initiated 802 and image (or other sensor) data captured or obtained that is representative of the scene in which the device is located and AR content is to be rendered. One or more horizontal surfaces can be determined 806 from the image data as discussed herein. In this example user input is required. Accordingly, an intersection marker can be displayed 808 as an overlay over the live view of the scene as captured by a camera or other such marker. In some embodiments the virtual object can be displayed in a position relative to the actual view visible through goggles or another AR-capable display. An intersection maker can be displayed 808 relative to the live view. In most cases the initial placement will not correspond to the intersection location. A user can then be prompted 810 to adjust an orientation of the device in order to cause the intersection marker to be aligned with the intersection of the surfaces as visible in the live view. The application can receive 812 an indication that the maker position corresponds to the intersection, such as in response to user input as discussed herein. The position of a virtual place corresponding to the surface of interest can be determined 814 based at least in part upon the marker position, as well as other boundary information determinable from the image data. As above, the AR content or other virtual object(s) to be rendered can be determined 816 and then caused 818 to be rendered and displayed as an overlay with respect to the live view of the scene and corresponding to the virtual plane.

A display mechanism for a computing device, such as a display screen or lenses of AR goggles, can be used to display a live view of the scene. This can include a live view of image or video data captured by the camera, or can include an actual view of the scene through a transparent portion of the display, among other such options. The AR content to be rendered with the live view can be determined, such as may be based upon a current orientation of the device or display, as well as a current state of the application or other such information. The AR content can include one or more virtual objects to be rendered for display over the live view such that the AR content appears to exist in the physical scene. The location(s) for the AR content in the scene can also be determined, such as in response to a placement instruction from the user with respect to the virtual plane. As mentioned, this can include identifying one or more surfaces or objects in the scene and then identifying appropriate locations for virtually positioning the AR content. The AR content to be rendered can be determined, such as by determining an appropriate wire mesh and texture map for a character to be rendered through AR. Lighting and reflection effects can be applied as appropriate. As discussed, this can include determining the normal for the various pixel locations of the AR object, and determining the impact of one or more light sources or each of those pixels. As mentioned, the display mechanism may not be a part of the computing device doing the rendering but a separate display mechanism, such as an AR goggle peripheral or other such device. The process can continue to update the rendered content based on movements of the device, changes to the AR content through the application, or other such factors.

Figure 9:
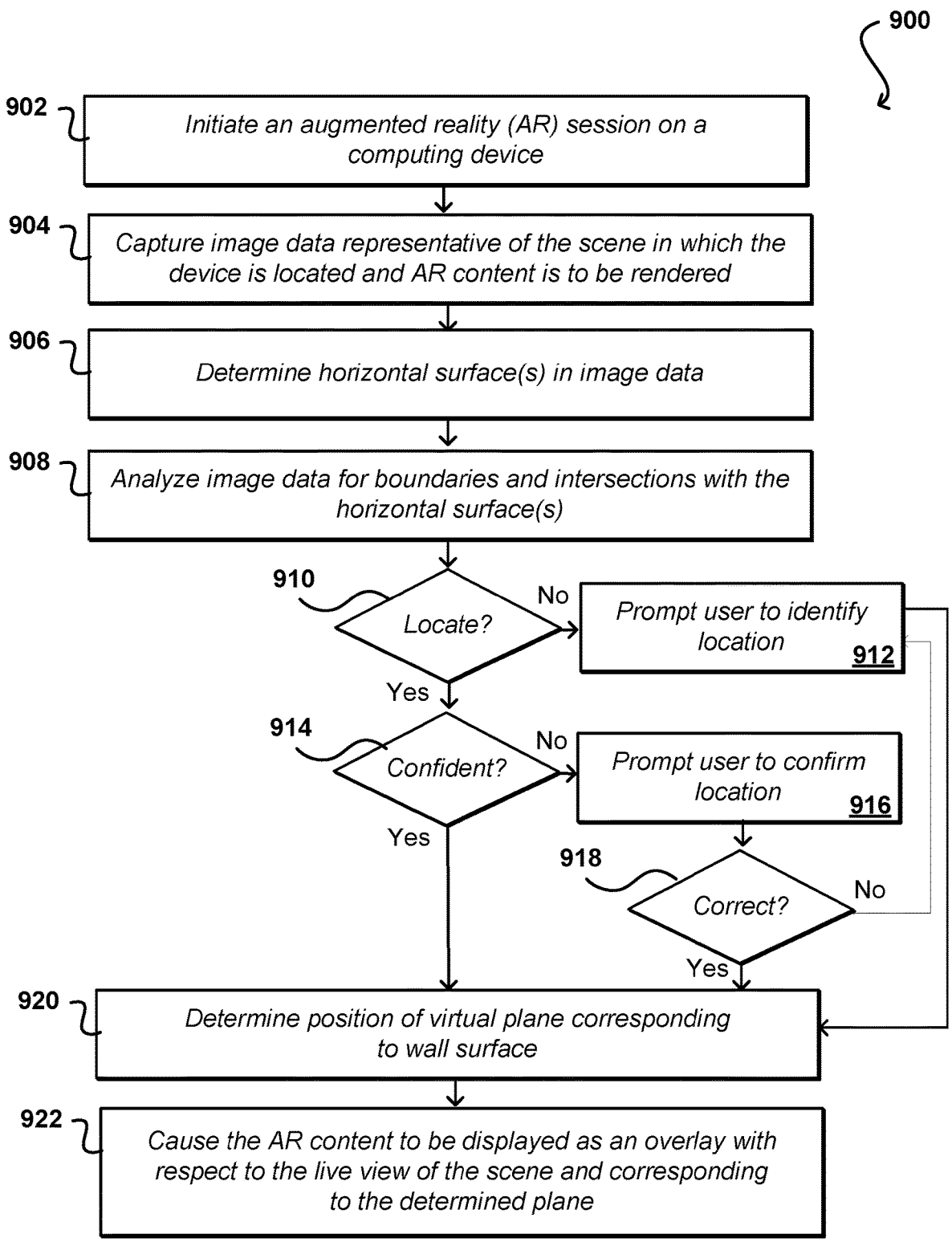
FIG. 9 illustrates a third example process for rendering AR content with respect to an optically challenging surface that can be utilized in accordance with various embodiments.

FIG. 9 illustrates another example process 900 for rendering virtual objects with respect to optically challenging surfaces that can be utilized in accordance with one embodiment. In this example, an AR session is initiated 902 and image (or other sensor) data captured 904 or obtained that is representative of the scene in which the device is located and AR content is to be rendered. One or more horizontal surfaces can be determined 806 from the image data as discussed herein. The image data can be analyzed 908 to attempt to identify boundaries of those surfaces, as well as intersections of the horizontal surfaces with other surfaces. In particular, some embodiments attempt to identify vertical surfaces that intersect with these horizontal surfaces, and identify the location of the intersection. If it is determined 910 that no boundaries or intersections can be located, at least that meet the search criteria, then the process can prompt 912 the user, such as through a notification or screen display, to identify the relevant boundary in a live view of the captured image data. If one or more boundaries or intersections are located, another determination can be made 914 as to whether the boundary or intersection is of a type of interest with at least a minimum level of confidence or certainty. If not, the user can be prompted 916 to confirm whether a detected boundary or intersection is of a type of interest, such as an intersection of a wall with the floor or ceiling. If it is determined 918 in response to user confirmation that the determination was incorrect, then the user can be prompted to input the location using approaches discussed herein. If an identified boundary is determined with sufficient certainty, is confirmed by the user, or is specified by the user, the position of a virtual plane corresponding to the boundary or intersection can be determined 920. As mentioned, the virtual wall can act as a reference surface that can be used to display AR content to cause the content to appear to be proximate the corresponding wall. The AR content can then be caused 922 to be displayed as an overlay with respect to the live view of the scene and corresponding to the virtual plane. As mentioned, the position can be locked in place so the AR content appears to be affixed to the wall in some embodiments, even as the orientation or position of the camera moves over time.

Figure 10:
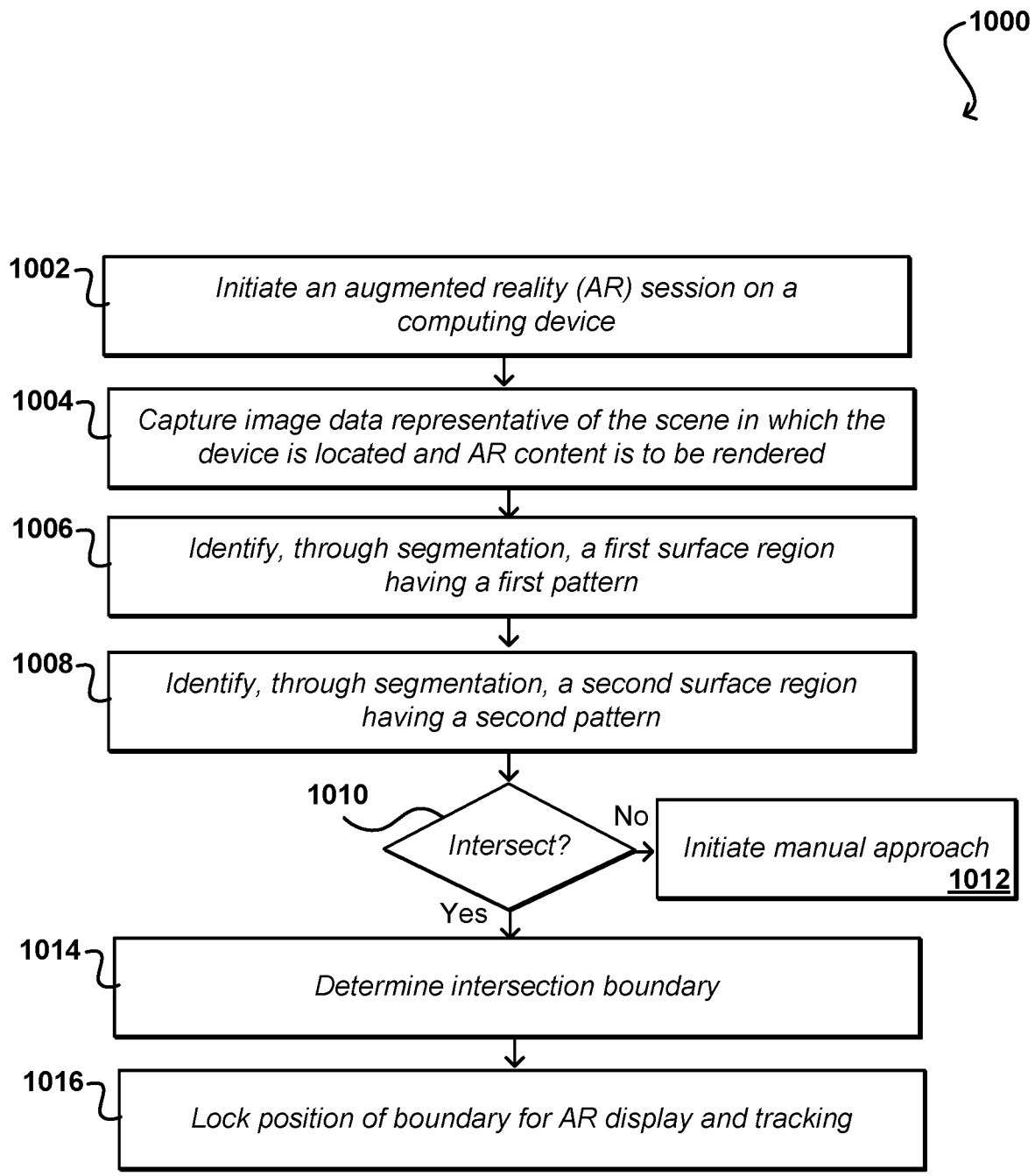
FIG. 10 illustrates a fourth example process for rendering AR content with respect to one or more optically challenging surfaces that can be utilized in accordance with various embodiments.

FIG. 10 illustrates another example process 1000 for rendering virtual objects with respect to optically challenging surfaces that can be utilized in accordance with one embodiment. In this example, an AR session is initiated 1002 and image (or other sensor) data captured 1004 or obtained that is representative of the scene in which the device is located and AR content is to be rendered. The captured image data can be analyzed using a semantic segmentation process, for example, to attempt to identify 1006 a first surface region having a first pattern or set of features. The segmentation process can also identify 1008 at least a second surface having a first pattern or set of features different than the first. The process may not be able to identify an actual surface, or location of such a surface, but may be able to identify a region of the image that is consistent from a segmentation standpoint and different from the first surface, which may correspond to an optically-challenging surface. A determination can be made 1010 as to whether the regions intersect. If not, a manual (or semi-manual) approach can be initiated 1012 as discussed elsewhere herein. If the regions intersect, the intersection boundary can be determined 1014 and the position of the boundary can be locked 1016 for AR display and tracking. If the location of one of the surfaces cannot be determined, the boundary can be used to position a virtual plane as discussed herein that can be used as an anchoring tool for displaying AR content with respect to that surface.

Figure 11:
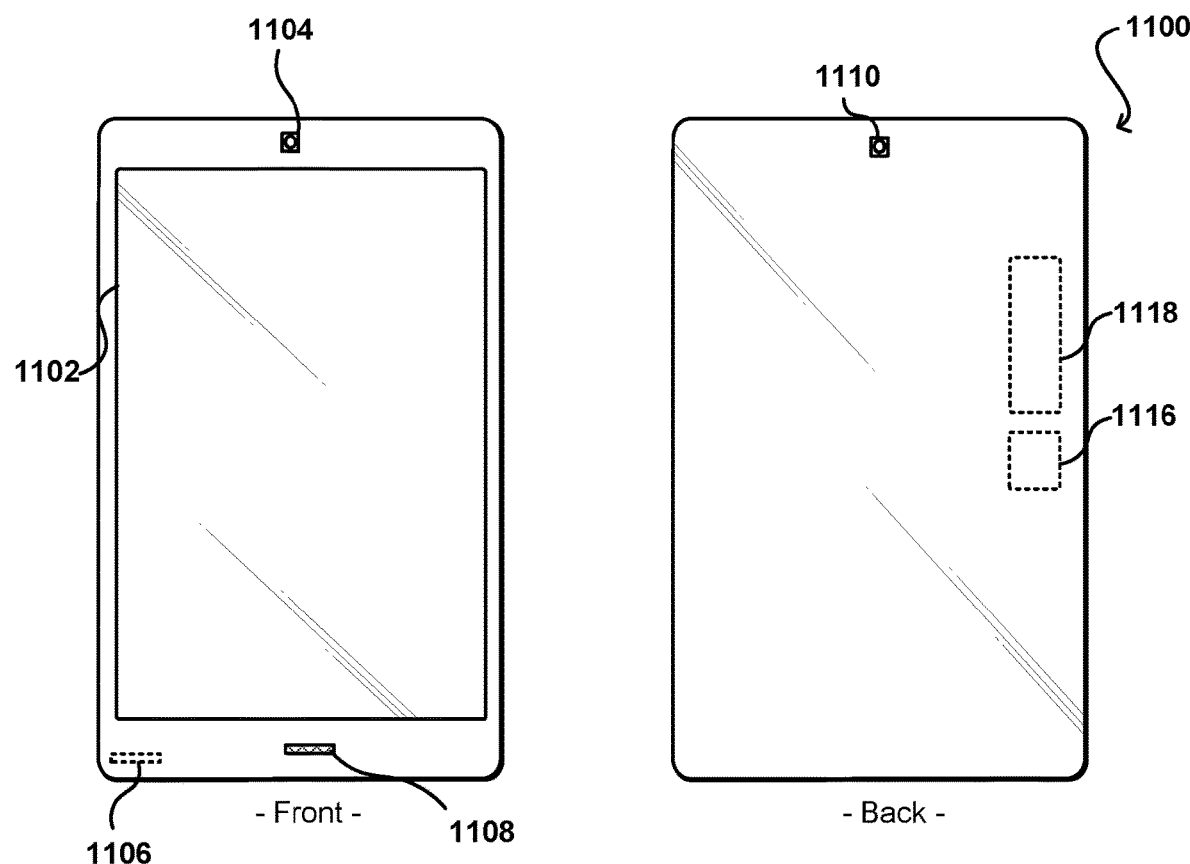
FIG. 11 illustrates an example computing device that can execute an augmented reality application in accordance with various embodiments.

FIG. 11 illustrates front and back views of an example electronic computing device 1100 that can be used in accordance with various embodiments. Although a portable computing device (e.g., a smartphone, an electronic book reader, or tablet computer) is shown, it should be understood that any device capable of receiving and processing input can be used in accordance with various embodiments discussed herein. The devices can include, for example, notebook computers, electronic book readers, personal data assistants, cellular phones, video gaming consoles or controllers, television set top boxes, and portable media players, among others.

In this example, the computing device 1100 has a display screen 1102 (e.g., an LCD element) operable to display information or image content to one or more users or viewers of the device. The display screen of some embodiments displays information to the viewers facing the display screen (e.g., on the same side of the computing device as the display screen). The computing device in this example can include one or more imaging elements, in this example including an image capture element 1104 on the front of the device and at least one image capture element 1110 on the back of the device. It should be understood, however, that image capture elements could also, or alternatively, be placed on the sides or corners of the device, and that there can be any appropriate number of capture elements of similar or different types. Each image capture element 1104 and 1110 may be, for example, a camera, a charge-coupled device (CCD), a motion detection sensor or an infrared sensor, or other image capturing technology.

As discussed, the device can use the images (e.g., still or video) captured from the imaging elements 1104 and 1110 to generate a three-dimensional simulation of the surrounding environment (e.g., a virtual reality of the surrounding environment for display on the display screen of the device). Further, the device can utilize outputs from at least one of the image capture elements 1104 and 1110 to assist in determining the location and/or orientation of a user and in recognizing nearby persons, objects, or locations. For example, if the user is holding the device, the captured image information can be analyzed (e.g., using mapping information about a particular area) to determine the approximate location and/or orientation of the user. The captured image information may also be analyzed to recognize nearby persons, objects, or locations (e.g., by matching parameters or elements from the mapping information).

The computing device can also include at least one microphone or other audio capture elements capable of capturing audio data, such as words spoken by a user of the device, music being hummed by a person near the device, or audio being generated by a nearby speaker or other such component, although audio elements are not required in at least some devices. In this example there is one microphone 1108 on the front side of the device. In some devices there may be only one microphone, while in other devices there might be at least one microphone on each side and/or corner of the device, or in other appropriate locations.

The device 1100 in this example also includes one or more orientation- or position-determining elements 1118 operable to provide information such as a position, direction, motion, or orientation of the device. These elements can include, for example, accelerometers, inertial sensors, electronic gyroscopes, and electronic compasses.

The example device also includes at least one communication mechanism 1106, such as may include at least one wired or wireless component operable to communicate with one or more electronic devices. The device also includes a power system 1116, such as may include a battery operable to be recharged through conventional plug-in approaches, or through other approaches such as capacitive charging through proximity with a power mat or other such device. Various other elements and/or combinations are possible as well within the scope of various embodiments.

Figure 12:
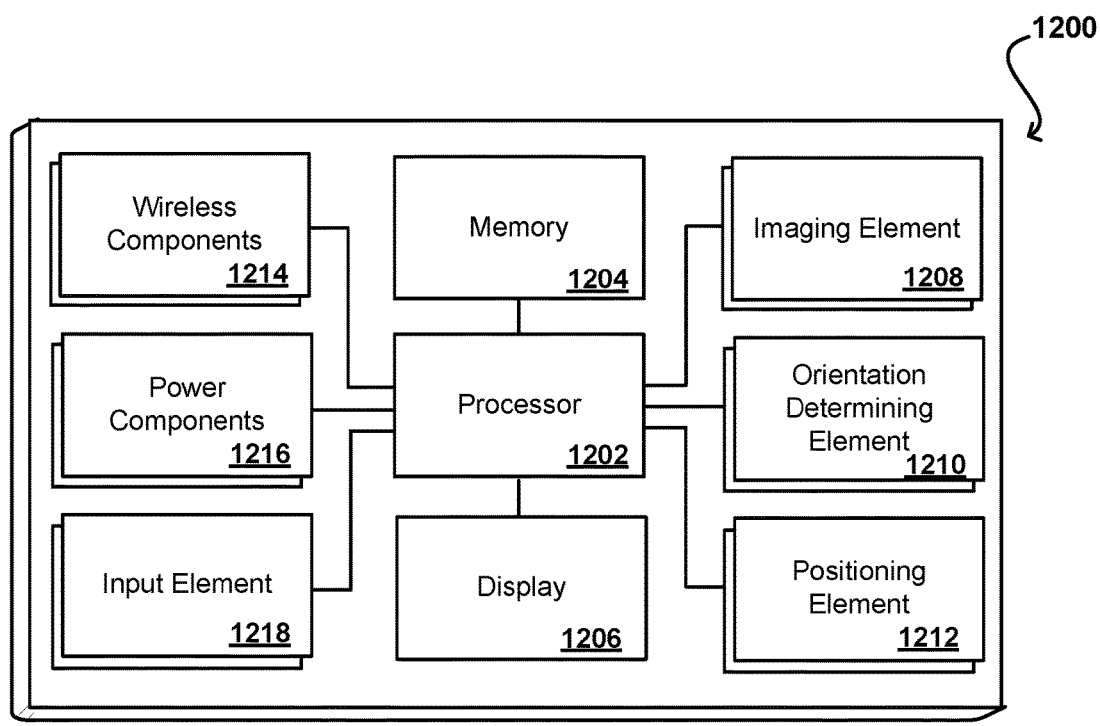
FIG. 12 illustrates example components of a computing device that can be used to implement aspects of the various embodiments.

FIG. 12 illustrates a set of basic components of an electronic computing device 1200 such as the device 1100 described with respect to FIG. 11. In this example, the device includes at least one processing unit 1202 for executing instructions that can be stored in a memory device or element 1204. As would be apparent to one of ordinary skill in the art, the device can include many types of memory, data storage, or computer-readable media, such as a first data storage for program instructions for execution by the processing unit(s) 1202, the same or separate storage can be used for images or data, a removable memory can be available for sharing information with other devices, and any number of communication approaches can be available for sharing with other devices.

The device typically will include some type of display screen 1206, such as a touch screen, electronic ink (e-ink), organic light emitting diode (OLED) or liquid crystal display (LCD), although devices such as portable media players might convey information via other means, such as through audio speakers.

As discussed, the device in many embodiments will include at least one imaging element 1208, such as one or more cameras that are able to capture images of the surrounding environment and that are able to image a user, people, or objects in the vicinity of the device. The image capture element can include any appropriate technology, such as a CCD image capture element having a sufficient resolution, focal range, and viewable area to capture an image of the user when the user is operating the device. Methods for capturing images using a camera element with a computing device are well known in the art and will not be discussed herein in detail. It should be understood that image capture can be performed using a single image, multiple images, periodic imaging, continuous image capturing, image streaming, etc. Further, a device can include the ability to start and/or stop image capture, such as when receiving a command from a user, application, or other device.

The example computing device 1200 also includes at least one orientation determining element 1210 able to determine and/or detect orientation and/or movement of the device. Such an element can include, for example, an accelerometer or gyroscope operable to detect movement (e.g., rotational movement, angular displacement, tilt, position, orientation, motion along a non-linear path, etc.) of the device 1200. An orientation determining element can also include an electronic or digital compass, which can indicate a direction (e.g., north or south) in which the device is determined to be pointing (e.g., with respect to a primary axis or other such aspect).

As discussed, the device in many embodiments will include at least a positioning element 1212 for determining a location of the device (or the user of the device). A positioning element can include or comprise a GPS or similar location-determining elements operable to determine relative coordinates for a position of the device. As mentioned above, positioning elements may include wireless access points, base stations, etc., that may either broadcast location information or enable triangulation of signals to determine the location of the device. Other positioning elements may include QR codes, barcodes, RFID tags, NFC tags, etc., that enable the device to detect and receive location information or identifiers that enable the device to obtain the location information (e.g., by mapping the identifiers to a corresponding location). Various embodiments can include one or more such elements in any appropriate combination.

As mentioned above, some embodiments use the element(s) to track the location of a device. Upon determining an initial position of a device (e.g., using GPS), the device of some embodiments may keep track of the location of the device by using the element(s), or in some instances, by using the orientation determining element(s) as mentioned above, or a combination thereof. As should be understood, the algorithms or mechanisms used for determining a position and/or orientation can depend at least in part upon the selection of elements available to the device.

The example device also includes one or more wireless components 1214 operable to communicate with one or more electronic devices within a communication range of the particular wireless channel. The wireless channel can be any appropriate channel used to enable devices to communicate wirelessly, such as Bluetooth, cellular, NFC, or Wi-Fi channels. It should be understood that the device can have one or more conventional wired communications connections as known in the art.

The device also includes a power system 1216, such as may include a battery operable to be recharged through conventional plug-in approaches, or through other approaches such as capacitive charging through proximity with a power mat or other such device. Various other elements and/or combinations are possible as well within the scope of various embodiments.

In some embodiments the device can include at least one additional input device 1218 able to receive conventional input from a user. This conventional input can include, for example, a push button, touch pad, touch screen, wheel, joystick, keyboard, mouse, keypad, or any other such device or element whereby a user can input a command to the device. These I/O devices could even be connected by a wireless infrared or Bluetooth or other link as well in some embodiments. Some devices also can include a microphone or other audio capture element that accepts voice or other audio commands. For example, a device might not include any buttons at all, but might be controlled only through a combination of visual and audio commands, such that a user can control the device without having to be in contact with the device.

In some embodiments, the device can have sufficient processing capability, and the imaging element and associated analytical algorithm(s) may be sensitive enough to distinguish between the motion of the device, motion of a user's head, motion of the user's eyes and other such motions, based on the captured images alone. In other embodiments, such as where it may be desirable for the process to utilize a fairly simple imaging element and analysis approach, it can be desirable to include at least one orientation determining element that is able to determine a current orientation of the device. In one example, the at least one orientation determining element is at least one single- or multi-axis accelerometer that is able to detect factors such as three-dimensional position of the device and the magnitude and direction of movement of the device, as well as vibration, shock, etc. Methods for using elements such as accelerometers to determine movement of a device are also known in the art and will not be discussed herein in detail. Other elements for detecting orientation and/or movement can be used as well within the scope of various embodiments for use as the orientation determining element. When the input from an accelerometer or similar element is used along with the input from the camera, the relative movement can be more accurately interpreted, allowing for a more precise input and/or a less complex image analysis algorithm.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, magnetic tape drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and other non-transitory computer readable media for containing code, or portions of code, can include any appropriate media known or used in the art, such as but not limited to volatile and non-volatile, removable and non-removable media implemented in any method or technology for storage of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method, comprising:
capturing, using a camera of a computing device, image data representative of a scene;
analyzing, using a visual odometry process, the image data to determine a horizontal surface represented in the image data;
identifying an intersection between the horizontal surface and a vertical surface, a location of the vertical surface unable to be confirmed by the visual odometry process;
generating a virtual plane locked at a position of the intersection and extending vertically;
determining augmented reality (AR) content to be displayed; and
causing the AR content to be displayed for a position in the scene proximate the virtual plane.

2. The computer-implemented method of claim 1, further comprising:
identifying the intersection automatically based at least in part upon a location and a size of a boundary of the horizontal surface in a view represented in the image data.

3. The computer-implemented method of claim 2, further comprising:
prompting a user for confirmation of the intersection if a confidence level for the intersection falls below a minimum confidence threshold.

4. The computer-implemented method of claim 1, further comprising:
identifying the intersection by prompting a user to identify the intersection and receiving indication of a location of the intersection from the user.

5. The computer-implemented method of claim 4, further comprising:
receiving the indication of the location corresponding to at least one of a virtual line drawn on a touch screen displaying a live view, one or more points indicated on the touch screen, or a selection of an input while the computing device is in an orientation such that an intersection marker coincides with the location of the intersection as displayed.

6. A computer-implemented method, comprising:
capturing image data representative of a scene;
identifying a horizontal surface in the scene;
determining a boundary of the horizontal surface represented in the image data that is indicative of a second surface intersecting the horizontal surface;
determining that the second surface is undetectable with high confidence;
generating a virtual plane corresponding to the second surface; and
rendering a virtual object for display at a location in a live view of the scene proximate the virtual plane.

7. The computer-implemented method of claim 6, further comprising:
capturing the image data using a camera of a computing device; and
rendering the virtual object as an overlay over the live view for display on a display device of the computing device.

8. The computer-implemented method of claim 6, further comprising:
analyzing the image data using visual odometry to identify the horizontal surface.

9. The computer-implemented method of claim 6, further comprising:
locking a position of the virtual object, with respect to the scene, such that AR content will appear, when displayed, to remain proximate the second surface independent of movement of an electronic device displaying the AR content.

10. The computer-implemented method of claim 6, wherein the second surface is a vertical wall that is unable to be detected using a visual odometry process that identified the horizontal surface.

11. The computer-implemented method of claim 10, wherein the vertical wall has a surface that is at least one of reflective, transparent, or lacking visual features utilized by the odometry process.

12. The computer-implemented method of claim 6, further comprising:
identifying the intersection automatically based at least in part upon a location and a size of a boundary of the horizontal surface in a view represented in the image data.

13. The computer-implemented method of claim 12, further comprising:
prompting a user for confirmation of the intersection if a confidence level for the intersection falls below a minimum confidence threshold.

14. The computer-implemented method of claim 6, further comprising:
identifying the intersection by prompting a user to identify the intersection and receiving indication of a location of the intersection from the user.

15. The computer-implemented method of claim 14, further comprising:
receiving the indication of the location corresponding to at least one of a virtual line drawn on a touch screen displaying a live view, one or more points indicated on the touch screen, or a selection of an input while the computing device is in an orientation such that an intersection marker coincides with the location of the intersection as displayed.

16. The computer-implemented method of claim 14, further comprising:
analyzing the image data using semantic segmentation to identify regions corresponding to the horizontal surface and the second surface, the boundary being identified between the horizontal surface and the second surface.

17. A system, comprising:

at least one processor; and memory including instructions that, when executed by the at least one processor, cause the system to:

obtain image data representative of a scene;

identify a first surface in the scene;

determine a boundary of the first surface represented in the image data that is indicative of a second surface intersecting the first surface;

determine that the second surface is undetectable with high confidence;

generate a virtual plane corresponding to the second surface; and cause a virtual object to be rendered for display at a location in a live view of the scene proximate the virtual plane.

18. The system of claim 17, wherein the instructions when executed further cause the system to:

identify the intersection automatically based at least in part upon a location and size of a boundary of the first surface in a view represented in the image data; and prompt a user for confirmation of the intersection if a confidence level for the intersection falls below a minimum confidence threshold.

19. The system of claim 17, wherein the instructions when executed further cause the system to:

identify the intersection by prompting a user to identify the intersection and receiving indication of a location of the intersection from the user.

20. The system of claim 17, wherein the instructions when executed further cause the system to:

receive the indication of the location corresponding to at least one of a virtual line drawn on a touch screen displaying a live view, one or more points indicated on the touch screen, or a selection of an input while the computing device is in an orientation such that an intersection marker coincides with the location of the intersection as displayed.

* * * * *

UNITED STATES PATENT AND TRADEMARK OFFICE
CERTIFICATE OF CORRECTION

PATENT NO. : 10,726,597 B1
APPLICATION NO. : 16/016331
DATED : July 28, 2020
INVENTOR(S) : Jesse Chang et al.

Page 1 of 1

It is certified that error appears in the above-identified patent and that said Letters Patent is hereby corrected as shown below:

On the Title Page

Item [60] under Related U.S. Application Data, delete the paragraph and insert the following:
--Provisional Application No. 62/663,831, filed on April 27, 2018--

Signed and Sealed this
Thirty-first Day of August, 2021

Drew Hirshfeld
*Performing the Functions and Duties of the*
*Under Secretary of Commerce for Intellectual Property and*
*Director of the United States Patent and Trademark Office*